United States Patent
Baba et al.

(10) Patent No.: US 8,223,207 B2
(45) Date of Patent: Jul. 17, 2012

(54) SYSTEM FOR TRACKING A MOVING OBJECT, BY USING PARTICLE FILTERING

(75) Inventors: Kenji Baba, Kodaira (JP); Takaaki Enohara, Hino (JP); Yoshihiko Suzuki, Tokyo (JP); Yusuke Takahashi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 639 days.

(21) Appl. No.: 12/388,967

(22) Filed: Feb. 19, 2009

(65) Prior Publication Data

US 2009/0213222 A1 Aug. 27, 2009

(30) Foreign Application Priority Data

Feb. 21, 2008 (JP) ................................. 2008-040614

(51) Int. Cl.
*H04N 5/225* (2006.01)
(52) U.S. Cl. ........................................ 348/169; 382/103
(58) Field of Classification Search .................. 348/169; 382/103

See application file for complete search history.

(56) References Cited

U.S. PATENT DOCUMENTS

| | | | | |
|---|---|---|---|---|
| 6,999,599 | B2* | 2/2006 | Rui et al. | 382/103 |
| 7,376,246 | B2* | 5/2008 | Shao et al. | 382/103 |
| 7,835,542 | B2* | 11/2010 | Lin et al. | 382/103 |
| 2006/0285723 | A1* | 12/2006 | Morellas et al. | 382/103 |
| 2008/0063236 | A1* | 3/2008 | Ikenoue et al. | 382/103 |
| 2008/0240499 | A1* | 10/2008 | Porikli et al. | 382/103 |
| 2008/0243425 | A1* | 10/2008 | Eliazar | 702/150 |

FOREIGN PATENT DOCUMENTS

| | | |
|---|---|---|
| JP | 2003-216951 | 7/2003 |
| JP | 2005-165688 | 6/2005 |
| JP | 2008-14742 | 1/2008 |

OTHER PUBLICATIONS

Isard, M., et al., "Condensation—Conditional Density Propagation for Visual Tracking," International Journal of Computer Vision, vol. 29, No. 1, pp. 5-28, 1998, 24 pages.

Isard, M., et al., "Visual Motion Analysis by Probabilistic Propagation of Conditional Density," Department of Engineering Science, Univeristy of Oxford, Sep. 1998, 84 pages.

Smith, K., et al., "Using Particles to Track Varying Numbers of Interacting People," IDIAP Research Institute, IEEE Computer Society Conference on Computer Vision and Pattern Recognition, 2005, 8 pages.

MacCormick, J., et al., "A probabilities exclusion principle for tracking multiple objects," IEEE, 1999, 7 pages.

European Search Report mailed by the European Patent Office on Jun. 24, 2009 for counterpart Application No. 09152491.8-2218, 6 pages.

Notification for Reasons for Rejection Japanese Patent Appln. No. 2008-040614 dated Jan. 10, 2012, counterpart of U.S. Appl. No. 12/388,967 (4 pages).

* cited by examiner

*Primary Examiner* — Philip B Tran

(74) *Attorney, Agent, or Firm* — Finnegan, Henderson, Farabow, Garrett & Dunner, L.L.P.

(57) ABSTRACT

In a tracking system for tracking a moving object by using a particle filter, the particle filter is configured to arrange particles initially, in a standby state, in a given background region provided in the screen of a camera and to rearrange the particles with respect to the moving object in accordance with a change in likelihood that the object has with respect to the particles.

4 Claims, 10 Drawing Sheets

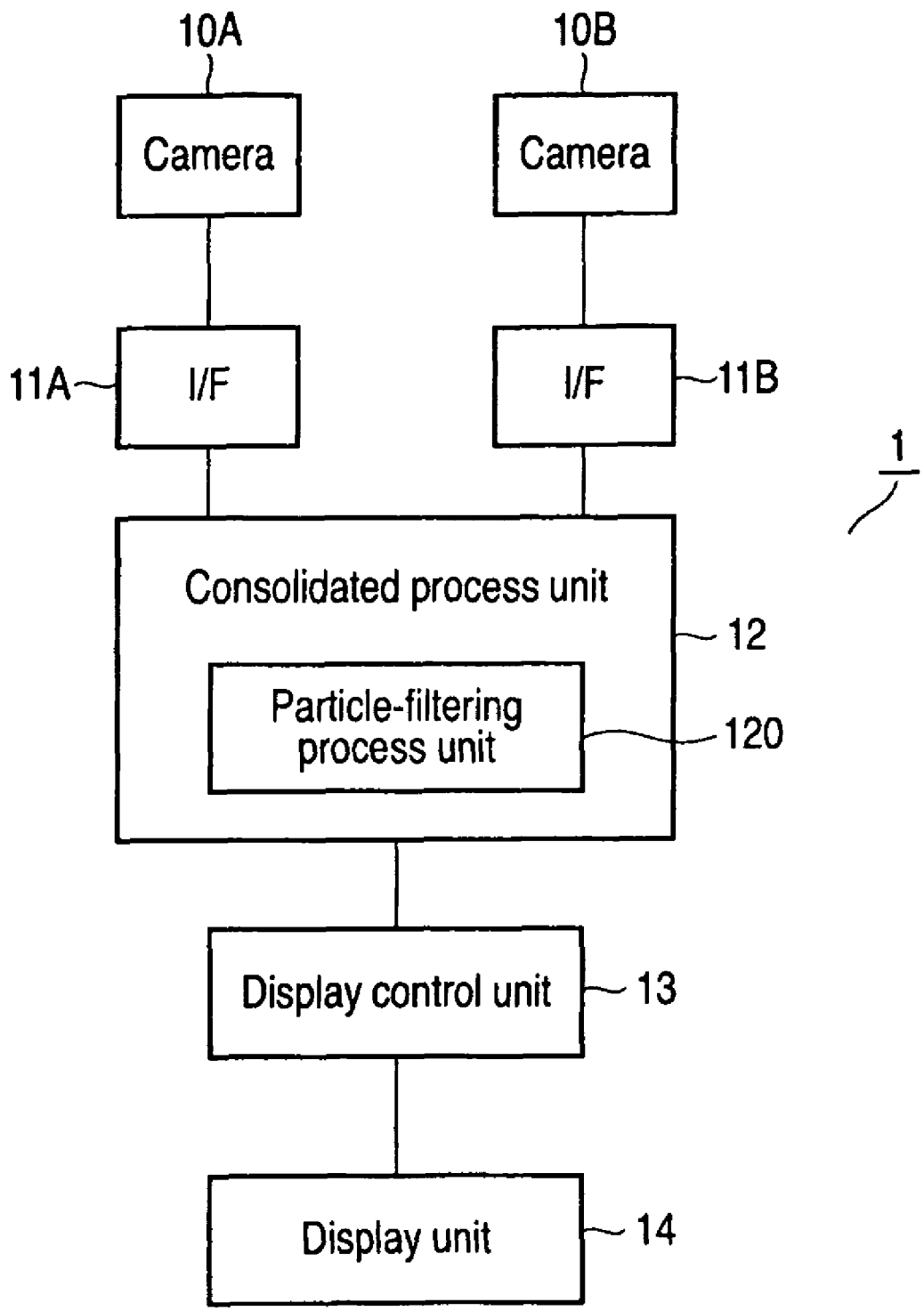
F I G. 1

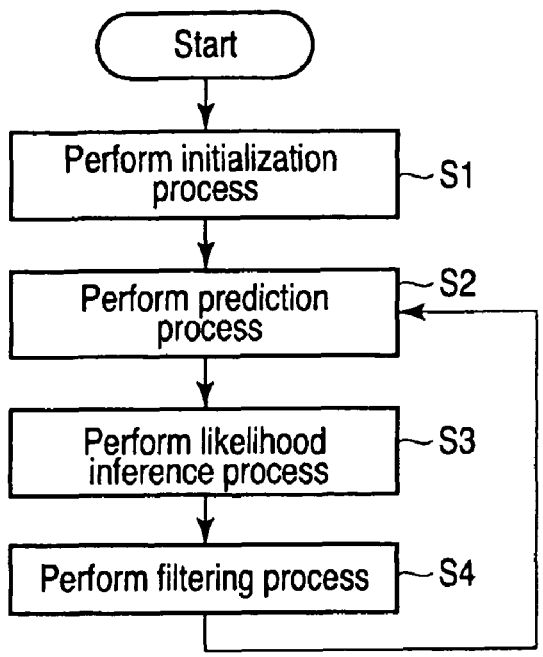
FIG. 2
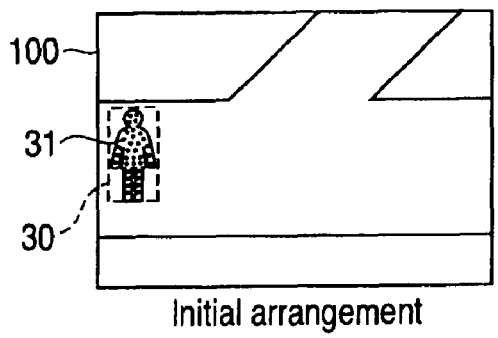
FIG. 3A  Initial arrangement
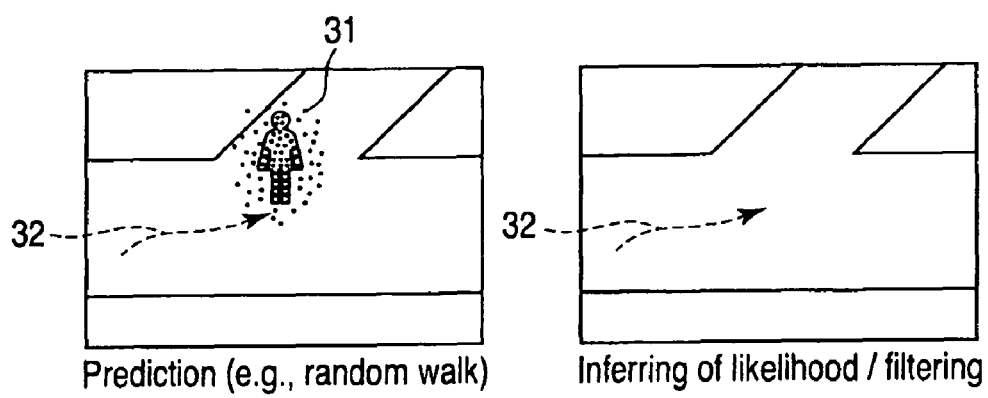
FIG. 3B  Prediction (e.g., random walk)
FIG. 3C  Inferring of likelihood / filtering

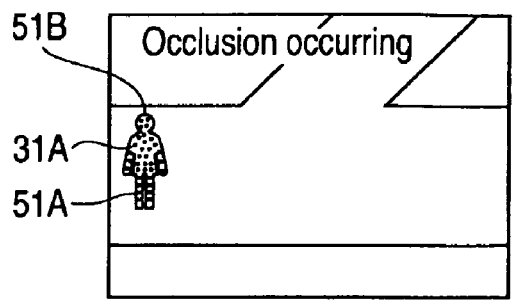
F I G. 7A
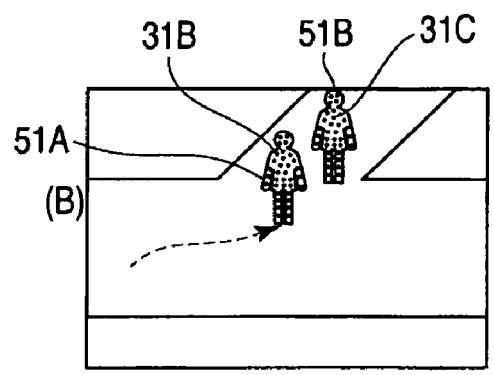
F I G. 7B
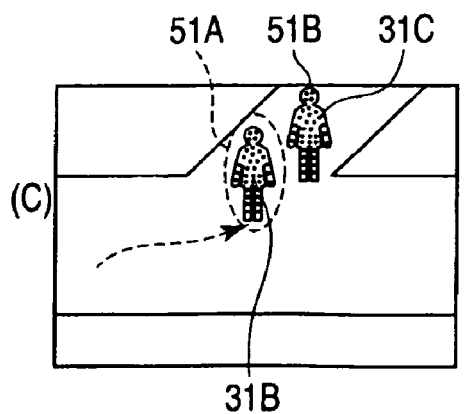
F I G. 7C

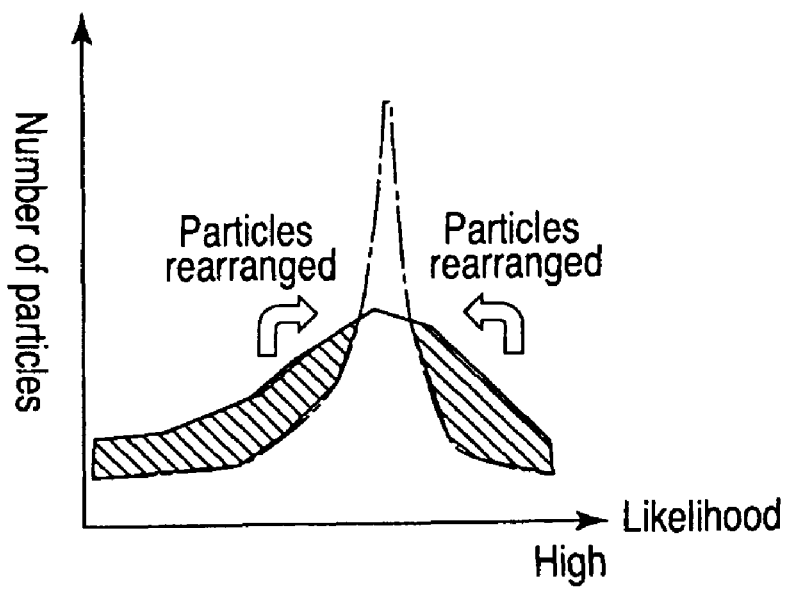
F I G. 10
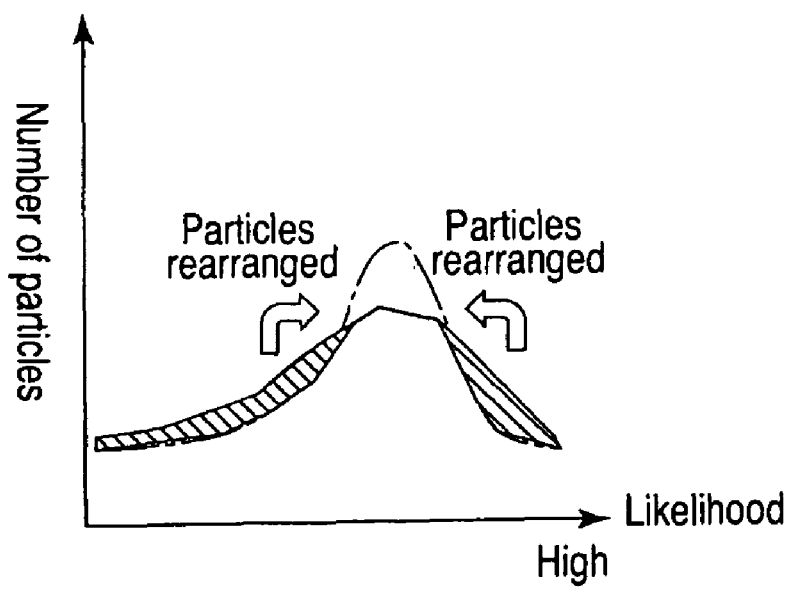
F I G. 11

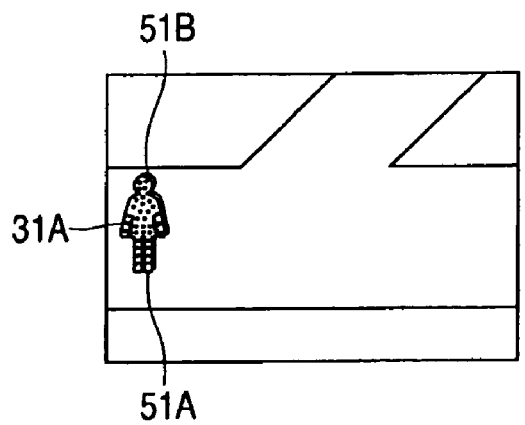
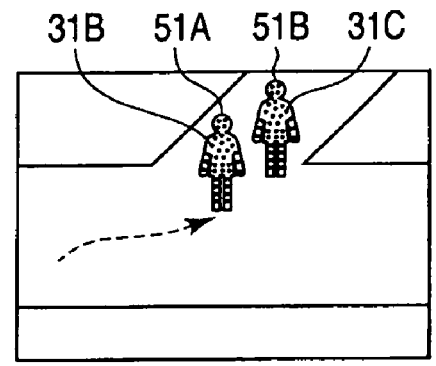
F I G. 14A        F I G. 14B
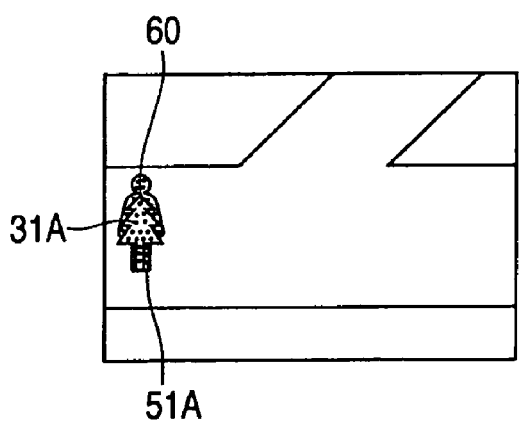
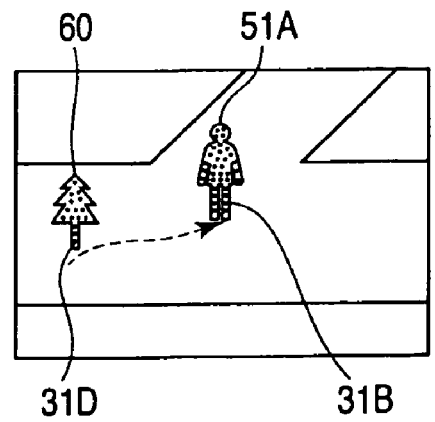
F I G. 15A        F I G. 15B

SYSTEM FOR TRACKING A MOVING OBJECT, BY USING PARTICLE FILTERING

CROSS-REFERENCE TO RELATED APPLICATIONS

This application is based upon and claims the benefit of priority from prior Japanese Patent Application No. 2008-040614, filed Feb. 21, 2008, the entire contents of which are incorporated herein by reference.

BACKGROUND OF THE INVENTION

1. Field of the Invention

The present invention relates to a system for tracking a moving object, such as a man, by utilizing particle filtering.

2. Description of the Related Art

A system has been developed, which processes video data acquired by a camera, thereby tracking an object, such as a walking man or any other moving object. (See, for example, Jpn. Pat. Appln. KOKAI Publication No. 2003-216951.) In recent years, a system for tracking a moving object by means of an algorithm called "particle filtering" has been exploited. (See, for example, Jpn. Pat. Appln. KOKAI Publication No. 2005-165688.).

In a tracking method utilizing particle filtering, particle filtering is performed. Particle filtering comprises four processes: initialization, prediction, likelihood inference and filtering. The tracking method can track a moving object, without the necessity of describing a motion model of the object. In a practical example of the tracking method, a moving object is regarded as a group of particles, and the particles constituting the group are tracked, thereby to track the moving object.

The conventional method of tracking a moving object is to track the region in which the object exists, or to detect this region by using the moving object (e.g., silhouette model) (or to perform an initialization process) and then to interpret the region continuously, thereby to track the moving object. In the conventional method, a motion model of the object may be introduced into the region extracted as a candidate region in which the moving object may exist, in order to increase the ability of detecting the region in which the object exists. Even if the motion model is used, however, the ability of tracking that region may decrease if the candidate region changes in shape, from time to time, due to the moving object as seen (at a specific camera view angle) or to the ability of detecting that region.

Any tracking method that utilizes particle filtering is advantageous because it can track a moving object without describing a motion model of the object. The tracking method is disadvantageous, however, in the following respects.

As mentioned above, the tracking system using the particle filtering is composed of four processes, i.e., initialization, prediction, likelihood inference and filtering. In the initialization process, the moving object (e.g., a man) is detected (extracted) and particles are then initially arranged.

The moving object may be detected by using a single-lens camera. In this case, however, the object can hardly be detected if the background is complicated and many other objects exist. Further, any other moving object cannot be well tracked based on the initial value acquired of the first moving objected detected if the initial value is not so accurate as desired. In view of this, the moving object must not be detected in the initialization process, or some measures must be taken to increase the ability of detecting the object.

In the prediction process, a system model defined beforehand is used. The system model may be influenced by the background, particularly if the object to track is a walking man. This is because the number of particles defining the walking man decreases due to the so-called random walk of the man (which depends on a random-walk parameter). That is, the system model can indeed be compatible with the random walk of a man, but may probably be arranged outside the man to be tracked. Inevitably, the system model may be located at a wrong position if the background is found to have high likelihood in the likelihood inference process.

In a process of rearranging the particles, so-called "occlusion" may occur if several people, for example, are photographed overlapping any other by a camera. Occlusion is a visual phenomenon in which the image photographed shadowed, in part or entirety, and cannot be recognized. If the occlusion takes happens, only the person standing foremost will have high likelihood. Consequently, the particles may be arranged densely at this person.

If the tracking method using the particle filtering is started while the occlusion is occurring, no particles are arranged at any person standing behind and thus shadowed even after the occlusion has been cancelled. That is, if occlusion occurs in the initialization process, only the person standing foremost will be tracked, whereas any person standing behind this person will not be tracked at all.

BRIEF SUMMARY OF THE INVENTION

An object of the present invention is to provide a tracking system for performing a tracking method that uses particle filtering, which can reliably arrange particles with respect to a moving object, irrespective of the ability of detecting the moving object in the initialization process, and which can therefore increase the ability of tracking the moving object.

A tracking system according to an aspect of this invention is configured to track a moving object, by using particle filtering. The system comprises: a camera configured to photograph the mobbing object; an initial arrangement module configured to arrange particles, in a standby-state, in a background included in an image photographed by the camera; and a rearrangement module configured to rearrange the particles with respect to the moving object included in the image, in accordance with a change in likelihood of the particles arranged in the standby state.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the major components of a tracking system according to a first embodiment of this invention;

FIG. 2 is a flowchart explaining the basic sequence of the particle filtering used in the first embodiment;

FIGS. 3A to 3C are diagrams explaining the initialization process of the particle filtering performed in the first embodiment;

FIG. 7A to 7C are diagram explaining a method of detecting the cancellation of occlusion in the second embodiment;

FIG. 10 is a diagram explaining a method of controlling the particle rearrangement, which is performed in the third embodiment;

FIG. 11 is a diagram explaining another method of controlling the particle rearrangement, which is performed in the third embodiment;

FIGS. 14A and 14B are diagrams explaining the sequence of a tracking method according to a sixth embodiment of the invention; and FIGS. 15A and 15B are diagrams explaining the sequence of a different tracking method according to the sixth embodiment.

DETAILED DESCRIPTION OF THE INVENTION

Figure 4:
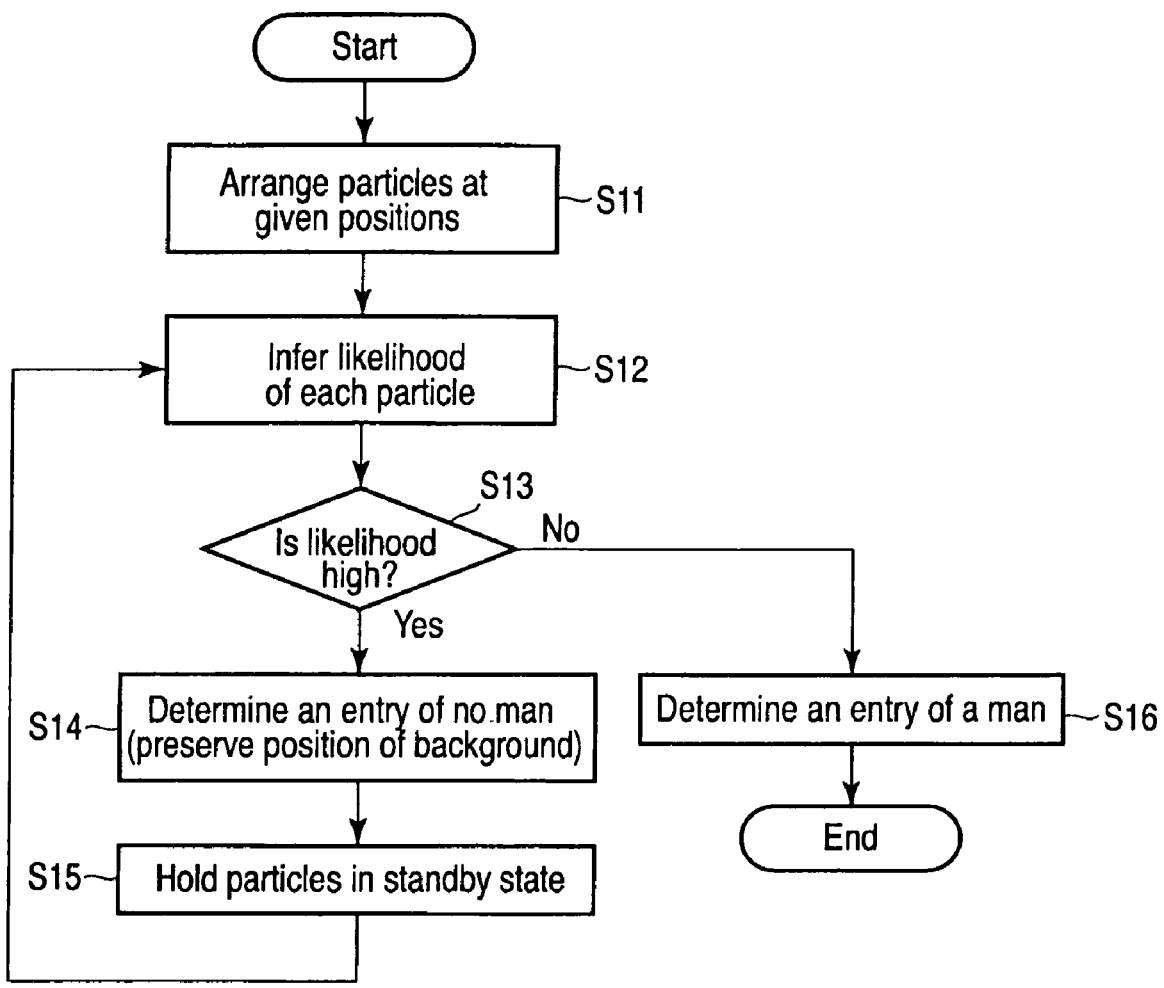
FIG. 4 is a flowchart explaining the sequence of the initialization process performed in the particle filtering according to the first embodiment.

Embodiments of the present invention will be described with reference to the accompanying drawings.

First Embodiment (Configuration of the System)

FIG. 1 is a block diagram showing the major components of a tracking system 1 according to a first embodiment.

As FIG. 1 shows, the tracking system 1 has first and second cameras 10A and 10B, interfaces 11A and 11B, a consolidated process unit 12, a display control unit 13, and a display unit 14. The interfaces 11A and 11B are connected to the cameras 10A and 10B, respectively.

The first and second cameras 10A and 10B are installed in, for example, a building. They are video cameras for photographing moving objects, such as men walking in the building. The interface 11A processes the video data acquired by the camera 10A, generating a digital video signal. Similarly, the interface 11B processes the video data acquired by the camera 10B, generating a digital video signal. The digital video signals are supplied to the consolidated process unit 12.

The consolidated process unit 12 is a main unit of the tracking system 1. The unit 12 is composed of computer hardware and software and configured to perform the tracking method according to the present embodiment. The consolidated process unit 12 includes a particle-filtering process unit 120 that performs particle filtering according to this embodiment as will be explained later. Hereinafter, the particle-filtering process unit 120 shall be referred to as "particle filter." The particle filter 120 corresponds to modules that perform various processes to achieve the particle filtering.

The display control unit 13 can cause the display unit 14 to display, on the screen thereof, the data representing the result of the tracking method the consolidated process unit 12 has performed or the images the cameras 10A and 10B have photographed.

(Operation of the Tracking System)

How the tracking system 1 having the particle filter 120 as main unit operates will be explained below.

First, the basic sequence the particle filter 120 performs will be explained with reference to the flowchart of FIG. 2.

As shown in FIG. 2, the particle filter 120 performs an initialization process, a prediction process, a likelihood inference process and a filtering process, in the order mentioned, on the video data about the images photographed by the cameras 10A and 10B.

In the initialization process, the particle filter 120 detects background difference, time difference and edge data detects (extracts) a moving object, such as a walking man, initially arranging particles (Step S1). More specifically, the particle filter 120 performs the initialization process, arranging particles 31 in the image (view angle) photographed by the cameras 10A and 10B and displayed on the screen 100 of the display unit 14, thereby forming an image 30 of the walking man extracted.

In the prediction process, a system model (different from a motion model of the object, e.g., a man) is defined, and the motion of the object (e.g., a man) is predicted (Step S2). More precisely, the motion 32 of the object, such as a man, is predicted and the particles 31 are arranged based on the motion 32 predicted.

In the likelihood inference process, the characteristic value of the moving object, such as a man, is defined as a likelihood function, thereby determining the reliability of each of the particles arranged (Step S3). The likelihood depends on the characteristic value used to track the moving object, such as a man, and is, therefore, a factor that determines the performance of the tracking method that utilizes the particle filtering. In the filtering process, the particles that have been inferred as having low likelihood are rearranged (Step S4). To be more specific, these particles are rearranged as the man walks, making the motion 32 as shown in FIG. 3C. (In this case, the object eventually disappears from the screen 100, and the tracking is terminated at this time.)

Unlike the sequence of the basic process described above, the particle filter 120 according to this embodiment performs not an initialization process of initially arranging the particles by using not the result of detecting the moving object, such as a man (i.e., extraction result), but a process including a step of preliminary arranging (or scattering) the particles in the screen (view angle) 100.

The sequence of the initialization process the particle filter 120 performs in the present embodiment will be explained with reference to the flowchart of FIG. 4 and to FIGS. 5A to 5D.

Figure 5A:
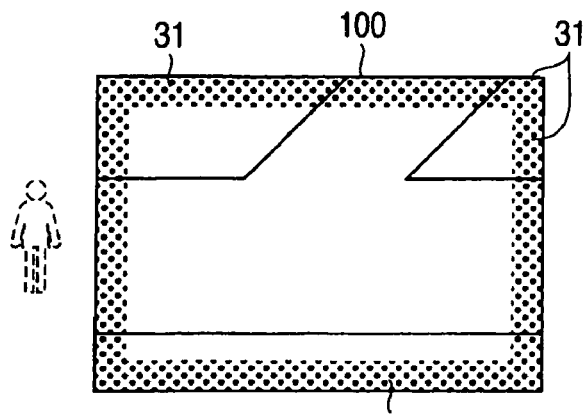
FIGS. 5A to 5D are diagrams showing examples of initial particle arrangements, which are applied to the first embodiment.
Figure 5B:
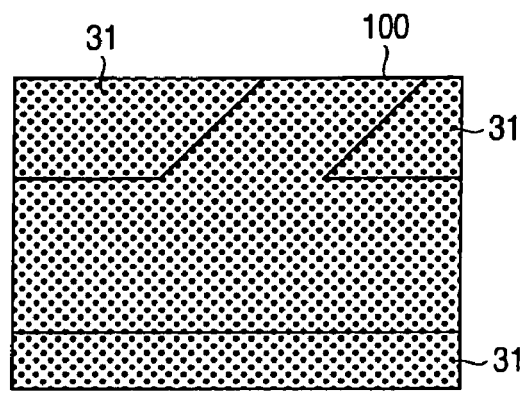
Figure 5C:
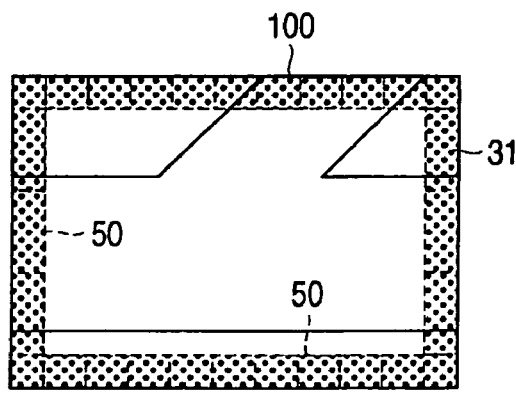

First, the particle filter 120 initially arranges particles 31 in a standby state in the given background region of the screen (view angle) 100 as illustrated in FIG. 5A (Step S11). FIG. 5A depicts the case where particles 31 enter at only the view-angle edges of the screen 100. FIG. 5B illustrates the case where particle 31 are arranged on the entire screen (view angle) 100. FIG. 5C shows the case where particles 31 in the standby state are divided into several groups 50. The size of each group 50 is adjusted in size so that the walking man may be well seen on the screen 100.

Next, the particle filter 120 performs the likelihood inference process on the particles 31 arranged in the standby state (Step S12). Then, it is determined whether any particle 31 exhibits relatively high likelihood is determined (Step S13). If any particle 31 exhibits relatively high likelihood (if YES in Step S13), a moving object, such as a man, is determined not to exist in the screen 100 (Step S14). In this case, the particles 31 arranged in the background region remain in the standby state (Step S15).

Figure 5D:
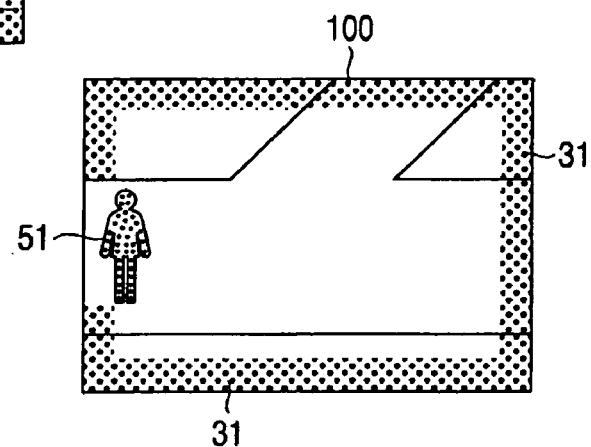

On the other hand, if the moving object 51, such as a man, moves into the screen (view angle) 100 as shown in FIG. 5D, the likelihood that the particles defining the moving object 15 exhibit changes to a relatively low value (that is, NO in Step S13). In this case, a moving object 51, such as a man, is determined to have entered the screen 100 (Step S16).

If the likelihood that the particles in the standby state exhibit changes to a relatively low value, the particle filter 120 performs the filtering process, rearranging the particles 31 at the object 51 such as a man. Then, the particle filter 120 starts the tracking method that uses the particles 31.

As described above, the particle filter 120 according to this embodiment can accomplish the initial arrangement of particles with respect to the moving object, such as a man (before performing the tracking method), without a process of detecting (extracting) the moving object, such as a man (i.e., extraction result). The initial arrangement of particles, with respect to the moving object, can therefore be reliably achieved irrespective of the ability of detecting the moving object, in the tracking system 1 that has the particle filter 120. This helps to enhance the ability of detecting the moving object.

The particle filter 120 for performing the initialization process in the present embodiment can operate in two alternative modes to process the particles 31 initially arranged in the screen (view angle) in the standby state (that is, scattered in the given background region of the screen). This operating mode of the particle filer 120 is called "standby mode." The particle filter 120 may be controlled so that its operating mode may be switched from the standby mode to a "tracking mode," as will be described below.

In the standby mode, the particle filter 120 arranges particles in a given background region. In this mode, unless the particles move (that is, if the particles are held at specific positions), they keep exhibiting high likelihood, no matter whichever characteristic value the moving object has. If the standby mode is so defined, a moving object such as a man will cover the background when it appears in the screen. As a result, each particle initially arranged as specified above will exhibit lower likelihood. At this time, the operating mode of the particle filter 120 changes to the "tracking mode."

At the time the operating mode changes from the standby mode to the tracking mode, the particle filter 120 determines whether the particles have been initially arranged (whether the initialization process has been completed), from the time elapsed after the appearance of the object in the screen and the features of the object (e.g., a man) (i.e., silhouette shape and size), or from the arrangement and distribution of the particles defining the object, such as a man, which have been learned beforehand as will be described later. When the initial arrangement of particles is completed, the operating mode of the particle filter 120 is switched from the standby mode to the tracking mode. Thus, the particle filter 120 starts performing the tracking method. When the moving object such as a man moves out of the screen (or undergoes "frame-out"), the operating mode of the particle filter 120 is switched from the tracking mode to the standby mode.

Second Embodiment

FIGS. 6A to 6C, 7A to 7C, and 8 are a diagram explaining the operation of a particle filter 120 according to a second embodiment of this invention. This particle filter 120 is incorporated in a tracking system that is identical in configuration to the tracking system 1 shown in FIG. 1. Therefore, the tracking system according to the second embodiment will not be described.

The particle filter 120 according to this embodiment has the function of cancelling occlusion that may occur while the tracking method is being performed after the initialization process (i.e., initial arranging and rearranging of particles), prediction process and likelihood inference process.

Occlusion is a phenomenon that may occur if, for example, some persons are photographed, one overlapping another. If occlusion happens, the image photographed will be shadowed, in part or entirety, and cannot be recognized. If the occlusion happens, only the person standing foremost will have high likelihood. The particles will inevitably be arranged densely at this person, who has high likelihood.

Figure 6A:
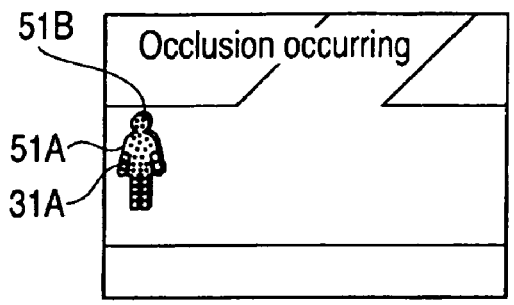
FIG. 6A to 6C are diagrams explaining the sequence of a tracking method according to a second embodiment of this invention.

To be more specific, occlusion occurs when several persons 51 appear in the screen (camera view angle), on overlapping another, as shown in FIG. 6A. During the occlusion, the particles (called particles 31A, for convenience) that appeared in the initialization process are rearranged densely at the person 51A standing foremost.

When the tracking method using the particle filtering is started while the occlusion is happening, no particles are arranged at a person 51B standing behind the foremost person 51A. In other words, all particles are arranged at the person 51A standing foremost. As a result, the person 51B disappears in the screen and can no longer be tracked.

Figure 6B:
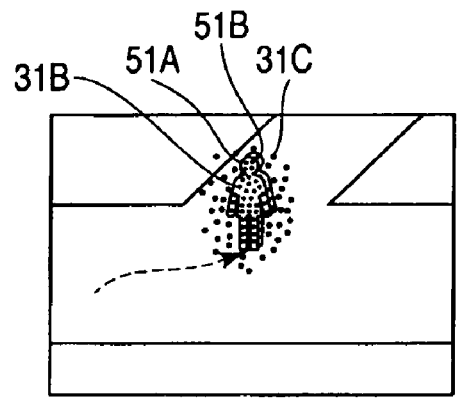
Figure 6C:
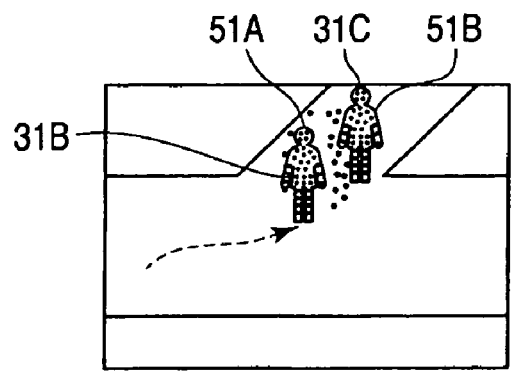

In view of this, the particle filter 120 according to this embodiment arranges the particles 31C of the standby mode are arranged near the particles 31B that accompany the moving man 51A, as is shown in FIG. 6B. When the person 51B standing behind appears as shown in FIG. 6C, the particle filter 120 makes the particles 31C of the standby mode follow the person 51B. The tracking method is thereby performed.

FIG. 7A to 7C are diagram explaining a method of detecting the cancellation in accordance with the characteristic of particle distribution in the image coordinates. This method will be explained below in detail.

FIG. 7A shows the occlusion that has occurred. The particles 31A are arranged densely at the person 51A standing foremost, because this image has high likelihood. When the occlusion is cancelled, the particles 31C of standby mode are made to follow the person 51B standing behind.

As a result, as shown in FIG. 7B, the particles are divided two groups of particles (see the broken-line arrow). In other words, the particles increase, as it were, in numbers as shown in FIG. 7C, providing one group 51A accompanies the person 51A standing foremost, and the other group 51B accompanies the person 51B standing behind. From this distribution of particles in the image coordinates, the particle filter 120 can detect the cancellation of occlusion.

Figure 8:
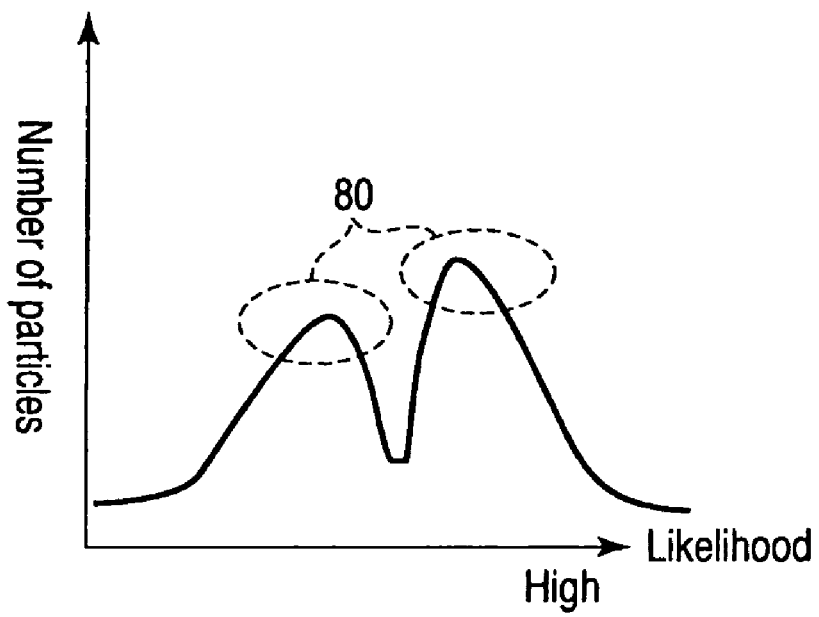
FIG. 8 is a diagram explaining the method of detecting the cancellation of occlusion in the second embodiment.

FIG. 8 is a diagram explaining the method of detecting the cancellation of occlusion. In this method, such a likelihood histogram of particles as shown in FIG. 8 is generated, and the peaks 80 in the likelihood distribution are counted. From these peaks 80, the particle filter 120 can detect that the particles have been divided into groups, thus cancelling the occlusion.

Thus, in the present embodiment, the particles 31C accompanying the person 51B and appearing near the particles 31B successfully tracked are arranged beforehand if occlusion has occurred in the initialization process. The person 51B (i.e., object) standing behind the particles (31B) can therefore be tracked well. That is, if occlusion happens in the initialization process, effective measures can be taken to cancel the occlusion. The method according to this embodiment may be used to detect the cancellation of the occlusion from the distribution of the particles of each group.

Third Embodiment

Figure 9:
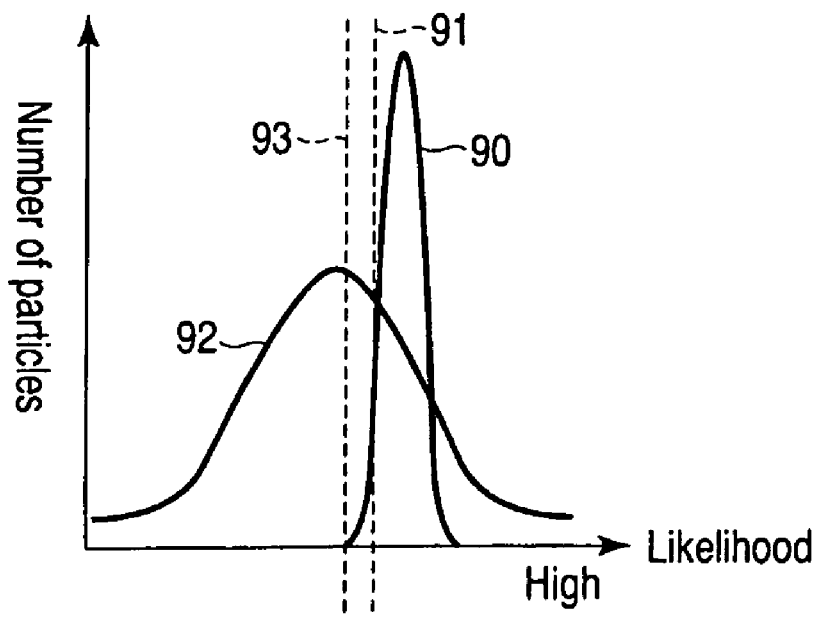
FIG. 9 is a diagram explaining a likelihood distribution of particles, which is observed in a third embodiment of the present invention.

FIGS. 9 to 11 are diagrams explaining how a particle filter 120 according to a third embodiment of the invention operates. In this embodiment, too, the tracking system incorporating the particle filter 120 is identical in configuration to the tracking system 1 shown in FIG. 1. Therefore, the tracking system according to the third embodiment will not be described.

The particle filter 120 according to this embodiment has the function of controlling the likelihood value in the likelihood inference process, after the above-mentioned initialization process has been completed (that is, after the particles have been initially arranged and then rearranged) in the tracking method that is composed of the initialization process, prediction process, likelihood inference process and filtering process.

The particle filer 120 first defines the characteristic value of the moving object to track, such as a man, as a likelihood function, and then infers the likelihood each particle arranged at the moving object from the likelihood function. The likelihood inferred is compared with a specific threshold value, in order to determine whether the object has been successfully tracked or not. If the background is complicated or similar in characteristic to the moving object, such as a man, the likelihood distribution of particles changes. Therefore, the particle filter 120 according to this embodiment controls the likelihood value in accordance with the likelihood distribution of particles.

More precisely, the particle filter 120 according to this embodiment sets such a likelihood threshold value 91 or such a likelihood threshold value 93 as shown in FIG. 9. Based on the threshold value 91 or 93, which particle has been correctly tracked (or which particle must be rearranged) is determined. The particle filter 120 will set the likelihood value 91 if the likelihood distribution of particle is such one as indicated by curve 90, and will set the likelihood value 93 if the likelihood distribution of particle is such one as indicated by curve 92. FIG. 9 explains how a threshold value is determined, which will be used to determine which particle has been correctly tracked. The likelihood threshold values 91 and 93 can be either fixed or automatically controlled.

FIGS. 10 and 11 are diagrams explaining how the rearrangement of particles is controlled so that a desirable likelihood distribution of particles may be attained. More precisely, FIG. 10 shows a method of controlling the rearrangement of particles so that the particles may have relatively high likelihood if the background is different in characteristic from the object to track. FIG. 11 shows a method of controlling the rearrangement of particles so that the particles may have relatively low likelihood if the background is different in characteristic from the object to track. Thus, the rearrangement of particles is controlled by changing the number of particles, at which the likelihood is the highest, in accordance with whether the background is different from or similar to the man who is the moving object to track.

As described above, this embodiment controls the likelihood threshold value is controlled in accordance with the likelihood distribution of particles when the likelihood distribution changes in accordance with whether the background is complicated or similar in characteristic to the man who is the moving object to track. Hence, the likelihood of each of the particles arranged can be reliably inferred. In other words, the present embodiment has the function of determining the particles that must be rearranged to track the moving object, by dynamically controlling the likelihood threshold value in accordance with the inferred likelihood of a particle group.

Fourth Embodiment

Figure 12:
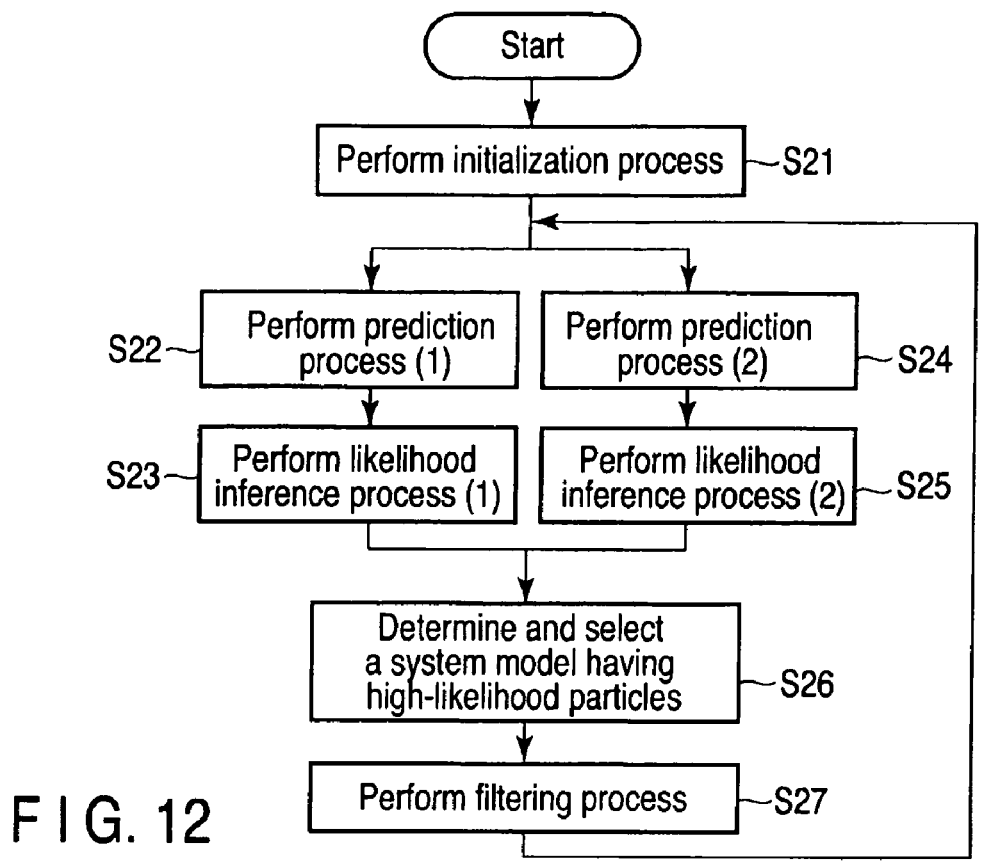
FIG. 12 is a diagram illustrating the concept of a system model applied to the particle filtering according to a fourth embodiment of the present invention.
Figure 13:
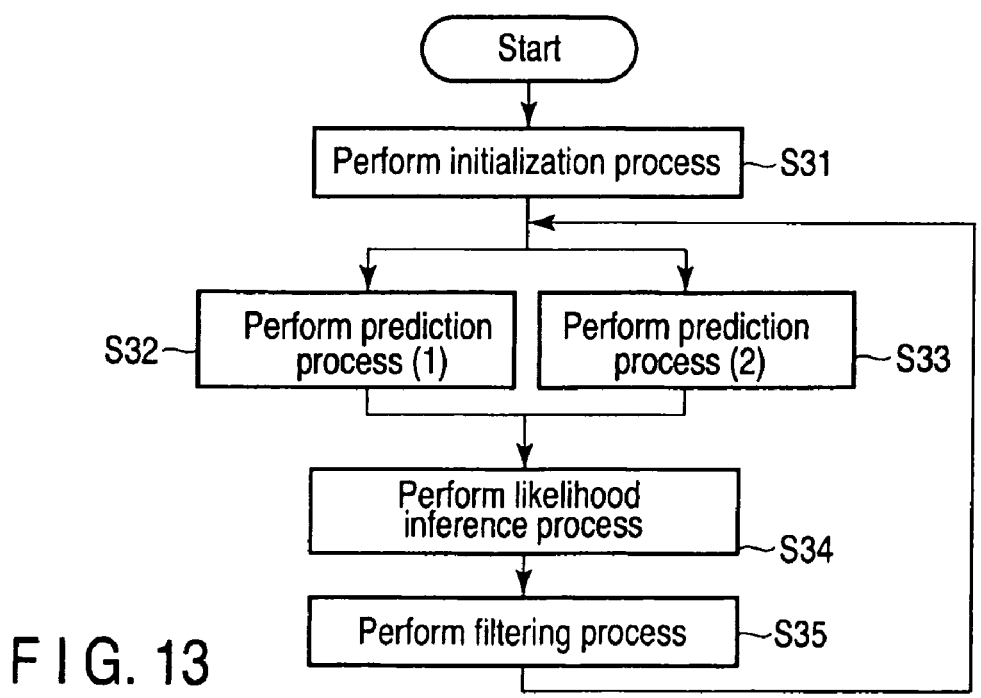
FIG. 13 is another diagram illustrating the concept of the system model applied to the particle filtering according to the fourth embodiment.

FIGS. 12 and 13 are diagrams illustrating the concept of a system model applied to the particle filtering according to a fourth embodiment of the present invention. In the present embodiment, too, the tracking system incorporating the particle filter 120 is identical in configuration to the tracking system 1 shown in FIG. 1. Therefore, the tracking system according to the fourth embodiment will not be described.

The particle filter 120 according to this embodiment is a hybrid type that is composed of system models and capable of performing a robust tracking method. To be more specific, the particle filter 120 is a hybrid unit that is composed of, for example, random-walk system models for tracking a random walk and linear-motion system models for tracking a constant-speed linear motion.

As shown in FIG. 12, the hybrid particle filter 120 performs an initialization process (Step S21), scattering and arranging particles in accordance with the random-walk system models and the linear-motion system models. Next, the hybrid particle filter 120 performs a prediction process and a likelihood inference process for the random-walk system models (Steps S22 and S23), and performs a prediction process and a likelihood inference process for the linear-motion system models (Steps S24 and S25).

Of the random-walk system model and the linear-motion system model, one having more high-likelihood particles than the other is selected (Step S26). Then, the filtering process is performed for the system model selected (random-walk or linear-motion system model) (Step S27).

Alternatively, as shown in FIG. 13, the hybrid particle filter 120 may first perform an initialization process (Step S31), scattering and arranging particles in accordance with the random-walk system models and the linear-motion system models. Then, the hybrid particle filter 120 performs a prediction process for the random-walk system models (Step S32), and performs a prediction process for the linear-motion system models (Steps S33). Next, the hybrid particle filter 120 selects particles of high likelihood from those arranged in the prediction process perfumed on each system model (Step S34). In other words, the particles of high likelihood are rendered effective, whereas the particles of low likelihood are discarded. Further, the hybrid particle filter 120 performs a filtering process on the particles of high likelihood, no matter whether processed by a random-walk system model or a linear-motion system model (Step S35).

Thus, in this embodiment, the hybrid particle filter 120 composed of, for example, random-walk system models and linear-motion system models (i.e., constant-speed linear motion models), can reliably select the particles found to have high likelihood in the likelihood inference process. This can accomplish a robust tracking method.

Fifth Embodiment

The present embodiment is concerned with a particle filter 120 for use in the tracking system 1 shown in FIG. 1. This particle filter 120 uses a database holding the data representing the attributes the particles have while being tracked. The tracking system incorporating this particle filter is identical in configuration to the tracking system 1 shown in FIG. 1. Therefore, the tracking system according to the fifth embodiment will not be described.

The database of the particle filter 120 according to the present embodiment is designed on the assumption that a moving object, such as a man, may move (or frame out) from the screen (view angle), with respect to the particles are following the moving object. The database therefore holds the data representing the particle distribution and the data showing the likelihood of each particle, as attribute information about the moving object being tracked.

When a person appears in the screen (view angle), the particle filter 120 refers to the database. If the attribute data about this person highly related to the attribute data about the particles newly arranged is retrieved from the database, the moving object is determined to have framed into the screen (reappeared). Therefore, if the attribute data about the man highly related to the attribute data about those particles cannot be retrieved, the person who has appeared in the screen (view angle) is regarded as a new person appearing in the screen.

Thus, in this embodiment, if the object, such as a man, being tracked temporarily disappears, it can be easily determined whether the man once having framed out of, or disappeared from, the screen (view angle), has framed into the screen again (or reappeared). Hence, if the person being tracked has framed out and reappeared, the particles at this person can be identified (that is, the data about these particles can be saved). This specific function of this embodiment can provide a system that can track objects moving in a broad area, by combining the video data items acquired by a plurality of cameras (such as cameras 10A and 10B shown in FIG. 1).

Sixth Embodiment

FIGS. 14A, 14B, 15A and 15B are diagrams that explain how a particle filter 120 operates in a sixth embodiment of this invention. In the present embodiment, too, the tracking system incorporating the particle filter 120 is identical in configuration to the tracking system 1 shown in FIG. 1. Therefore, the tracking system according to the fourth embodiment will not be described.

The particle filter 120 according to this embodiment learns the arrangement and distribution of particles existing at the object to track, from a reference image used as preliminary data, not from the data items (i.e., silhouette and size) about a model of the object, such as a man. From the arrangement and distribution of particles, acquired by learning, the particle filter 120 determines when the initial particle arrangement is completed. To be more specific, after the object has been tracked for a specific period, the particle filter 120 determines the time of completing the initial particle arrangement, by utilizing the particle distribution acquired by learning.

FIGS. 14A and 14B are diagrams explaining the sequence of a tracking method that is performed in accordance with the distribution of men, which has been acquired though learning. Occlusion occurs when two persons 51A and 51B, i.e., moving objects, enter the screen (view angle), one overlapping the other as shown in FIG. 14A. During the occlusion, particles 31A densely exist at only the person 51A standing in front of the person 51B as the particles are rearranged in the initialization process. This is because the person 51A stands in front of the other person 51B and therefore exhibits high likelihood.

When the person 51B appears from behind the person 51A, together with particles 31B that accompany the person 51A, because the occlusion has been cancelled, particles 31C are arranged to accompany the person 51B. That is, the particle filter according to this embodiment can perform a tracking method that arranges the particles 31C at the person 51B who appears in the screen when the occlusion is cancelled.

FIGS. 15A and 15B are diagrams explaining the sequence of a tracking method that is performed in accordance with the arrangement and distribution of particles, which have been acquired beforehand though learning.

As FIG. 15A shows, an object 60, not a man, may exist at the back of a person 51A which is a moving object being tracked. In this case, too, particles 31A initially arranged densely exist at only the person 51A standing in front of the object 60. As the person 51A walks as shown in FIG. 15B, particles 31B follow the person 51A. At this point, the occlusion is cancelled. As a result, the object 60 appears from behind the person 51A.

The particle filter 120 according to this embodiment arranges particles 31D at the object 60, determining that the object 60 that has just appeared has high likelihood. From the arrangement and distribution of particles, acquired beforehand though learning, the particle filter 120 determines that the object 60 is not a man. Then, the particle filter 120 makes the particles 31D disappear in the screen.

Thus, the present embodiment can determine that the completion of the initial arranging of particles, based on the arrangement and distribution of particles at the object being tracked, or by utilizing the particle distribution which has been acquired through learning and which depends on the distance to the man and the size (shape) thereof. This embodiment can track several persons, merely by learning how particles are distributed at each person. In this case, the possibility of occlusion can be recognized, and the data acquired through learning can be used as guide information in tracking each person.

Seventh Embodiment

A seventh embodiment of this invention is concerned with a particle filter 120 of hybrid type for use in the likelihood inference process. The tracking system incorporating this particle filter 120 is identical in configuration to the tracking system 1 shown in FIG. 1. Therefore, the tracking system according to the fifth embodiment will not be described.

The particle filter 120 according to this embodiment performs hybrid evaluation on the likelihood and performs. Further, the particle filter 120 performs, in parallel, likelihood inference processes that use various likelihood functions (e.g., luminance, texture, fog, color, etc.). The particle filter 120 then infers likelihood of each particle arranged at the moving object, such as a man, from the evaluated distribution of likelihood calculated in the likelihood inference process.

As has been described, the particle filter 120 according to the present embodiment has the function of inferring likelihood by performing hybrid evaluation of the likelihood. Therefore, the particle filter 120 can therefore select particles of high likelihood in the likelihood inference process, ultimately achieving a robust tracking method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system for tracking a moving object by using particle filtering, the system comprising:
   a camera configured to photograph the object;
   an initial arrangement module configured to arrange particles, in a standby-state, in a background included in an image photographed by the camera;
   a rearrangement module configured to rearrange the particles with respect to the object included in the image, in accordance with a change in likelihood of the particles arranged in the standby state;
   a module configured to cause the particles to follow the object, thereby performing a tracking process after the initial arrangement module has initially arranged the particles; and
   a module configured to arrange particles preliminarily near the particles following the object in the tracking process, in order to cancel occlusion occurring after the rearrangement module initially arranged the particles.

2. A system for tracking a moving object by using particle filtering, the system comprising:
   a camera configured to photograph the object;
   an initial arrangement module configured to arrange particles, in a standby-state, in a background included in an image photographed by the camera;
   a rearrangement module configured to rearrange the particles with respect to the object included in the image, in accordance with a change in likelihood of the particles arranged in the standby state;
   a control module configured to cause the initial arrangement module to:
      arrange, in a standby mode, the particles in the standby state in a given background region;
      detect that an operating mode of the system changes from the standby mode to a tracking mode for performing a tracking process of the object, when the object appears in the image photographed by the camera and the likelihood of the particles initially arranged in the standby mode decreases;
      cause the rearrangement module to rearrange the particles with respect to the object when the operating mode of the system is detected to change from the standby mode to the tracking mode, thereby detecting completion of the initial arrangement of particles; and
      change the operating mode of the system from the standby mode to the tracking mode after the completion of the initial arrangement of particles;
   a module configured to cause the particles to follow the object, thereby performing a tracking process after the initial arrangement module has initially arranged the particles; and
   a module configured to arrange particles preliminarily near the particles following the object in the tracking process, in order to cancel occlusion occurring after the rearrangement module initially arranged the particles.

3. The system according to claim 1, further comprising a module configured to cause, in the tracking process, the preliminarily arranged particles to follow a new object that appears when the occlusion is cancelled.

4. A system for tracking a moving object by using particle filtering, the system comprising:
   a camera configured to photograph the object;
   an initial arrangement module configured to arrange particles, in a standby-state, in a background included in an image photographed by the camera;
   a rearrangement module configured to rearrange the particles with respect to the object included in the image, in accordance with a change in likelihood of the particles arranged in the standby state;
   a control module configured to cause the initial arrangement module to:
      arrange, in a standby mode, the particles in the standby state in a given background region;
      detect that an operating mode of the system changes from the standby mode to a tracking mode for performing a tracking process of the object, when the object appears in the image photographed by the camera and the likelihood of the particles initially arranged in the standby mode decreases;
      cause the rearrangement module to rearrange the particles with respect to the object when the operating mode of the system is detected to change from the standby mode to the tracking mode, thereby detecting completion of the initial arrangement of particles; and
      change the operating mode of the system from the standby mode to the tracking mode after the completion of the initial arrangement of particles; and
   a likelihood inference module configured to perform a dynamic threshold value control based on a likelihood distribution inferred of particle groups, thereby to determine which particles should be rearranged, in the tracking process, in a complicated background or a background similar in characteristic to the object.

* * * * *